No. 682,331. Patented Sept. 10, 1901.
W. LUCK.
POULTRY KILLING APPARATUS.
(Application filed Apr. 26, 1900.)
(No Model.) 2 Sheets—Sheet 1.
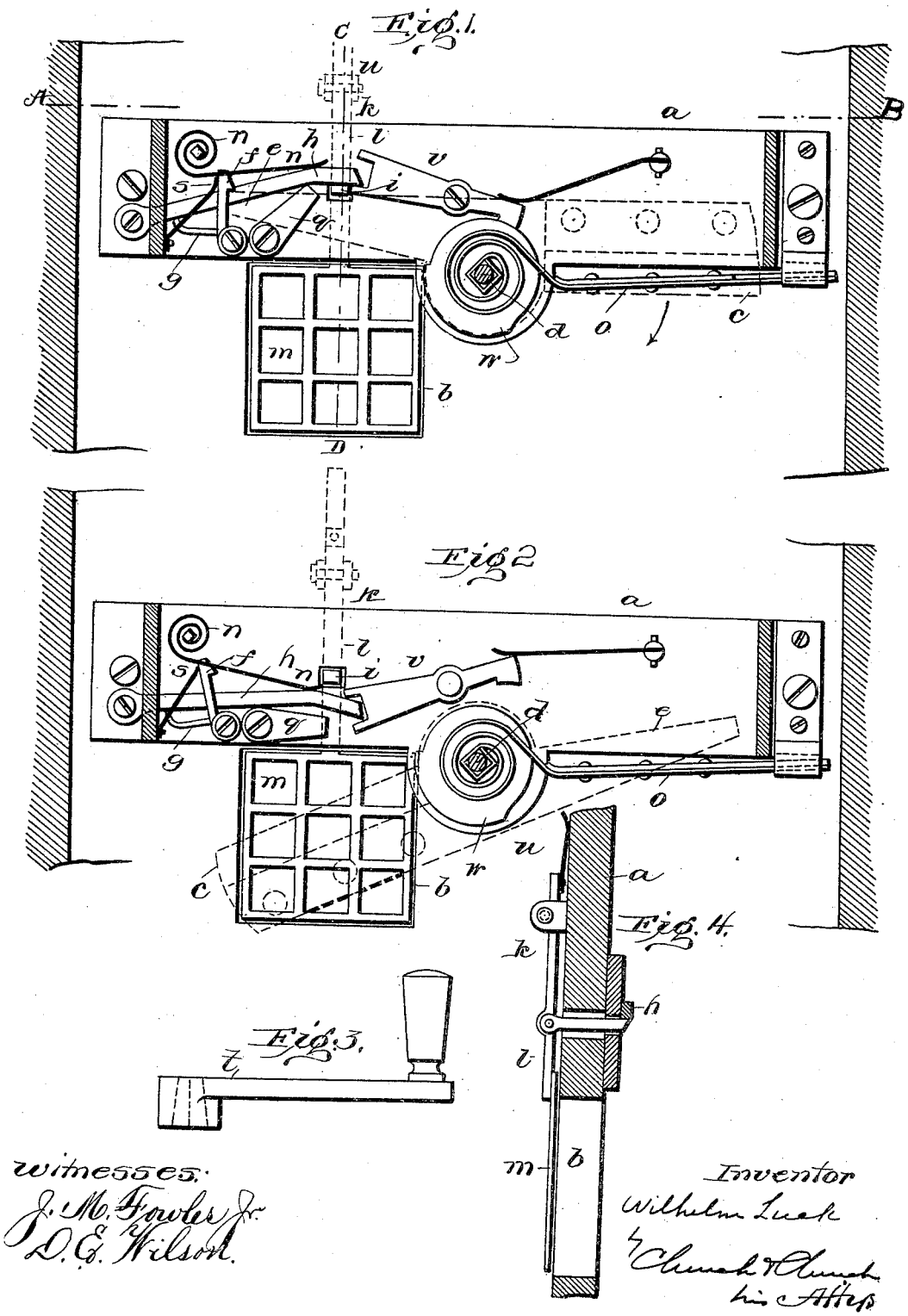

No. 682,331. Patented Sept. 10, 1901.
W. LUCK.
POULTRY KILLING APPARATUS.
(Application filed Apr. 26, 1900.)
(No Model.) 2 Sheets—Sheet 2.
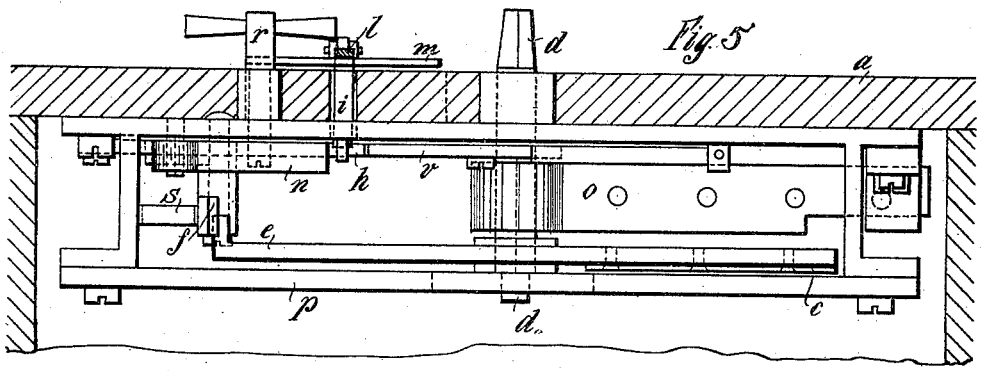

UNITED STATES PATENT OFFICE.

WILHELM LUCK, OF GROITZSCH, GERMANY.

POULTRY-KILLING APPARATUS.

SPECIFICATION forming part of Letters Patent No. 682,331, dated September 10, 1901.

Application filed April 26, 1900. Serial No. 14,485. (No model.)

*To all whom it may concern:*

Be it known that I, WILHELM LUCK, a subject of the King of Saxony, residing at Groitzsch, Saxony, Germany, have invented certain new and useful Improvements in or Relating to Poultry-Killing Apparatus, of which the following is a specification.

The present invention relates to a poultry-killing apparatus intended specially for killing fowls, which compares favorably with similar apparatus which have been devised to facilitate only the slaughtering of birds, while according to the present invention the killing of the bird is effected without any direct interference on the part of man. The animal is placed into a dark box into which light enters only through an opening. In striving to get out through the opening with a view of escaping from the darkness the bird will strike against a frame close to the opening, thereby releasing a knife actuated by a spring, which will quickly pass in front of the opening and cut off the bird's head, or at least cut so far into its head that death must be instantaneous.

The apparatus is represented in the accompanying drawings as applied to the inner side of a box.

Figure 1 is an elevation showing the position of the parts when the knife is set, the knife being in dotted lines to show underlying parts. Fig. 2 is a similar view showing the position of the parts when the knife has been sprung. Fig. 3 is a detail view of the crank for setting the lever. Fig. 4 is a vertical section on the line C D, Fig. 1. Fig. 5 is a cross-section of the line A B, Fig. 1.

The knife-lever is represented in Figs. 1 and 2 only by dotted lines, so as not to hide the parts arranged behind it.

The device is arranged on the inner side of the front wall of the box, the back of which is provided with a door, through which the bird to be killed is introduced. The front wall $a$ of the box is provided with an opening $b$, above which is arranged the frame of the device.

The knife $c$ is fixed to one of the arms of a knife-lever arranged on a revoluble axle $d$, the other end $e$ of which lever is held when the knife is set, as represented in Fig. 1, by one end of a bell-crank lever $f$, acting as a catch, Figs. 1 and 5. To do this, the horizontal arm $g$ of the bell-crank lever rests against a pivoted arm $h$, the latter being held in position by a projection $i$, Figs. 1 and 4. The said projection $i$ is attached to a lever $l$, pivoting at $k$, Figs. 1 and 3, which lever carries a wire or open-work frame $m$, arranged in front of the opening $b$. When the bird presses the frame outward, the support $i$ of the arm $h$ will be removed and a spring $n$, Fig. 1, will force the arm $h$ downward into the position shown in Fig. 2, in consequence of which the arm $g$ of the bell-crank lever $f$ will be pressed down, whereupon the catch on its other arm will release the knife-lever $e$, allowing the knife-lever to rapidly rotate in the direction indicated by the arrow, Fig. 1, being actuated by a strong spring $o$, suitably attached to the axle $d$ of the knife-lever, and the knife, passing close in front of the opening $b$, as shown in Fig. 2, will cut off the head of the bird. In the arrangement illustrated a bar $p$, Fig. 5, acts as a counter-support; but it may be replaced by a fixed knife, which then, in combination with the rotary knife, will act like a pair of scissors.

In order to reset the knife, the arm $h$ is raised into its original position by turning a lever $q$, Figs. 1 and 2, keyed on the axle of a handle $r$, whereby the arm $h$ is so much raised that the arm $g$ of the bell-crank lever $f$ can rise, and its other end will be pressed by the spring $s$ into the path of the knife-lever arm $e$, and then the knife-lever is turned back half a turn by means of the crank-lever $t$, applied to the square-sided axle $d$, when the catch $f$ will engage over the end of the arm $e$. As the arm $h$ ascends the projection $i$ will also spring forward, being actuated by a spring $u$, Fig. 4, pressing against the end of the pivoted lever $l$. The lever $v$, acting in combination with the arm $h$ and a cam-disk $w$, keyed on the axle $d$ of the knife-lever, is only intended to hold the latter in the course of being set—*i. e.*, after a quarter-turn—a condition which is advantageous in case a handle, such as $r$, is used for turning the axle $d$, but which is of less importance when a crank-lever $t$ is employed.

The locking device above described requires a special setting (by means of handle $r$ and lever $q$) when setting the knife. It insures, however, a great amount of security against an unintentional operation, such as by the bird knocking against any other part than the frame $m$, with great sensitiveness as regards its release. Owing to the advantageous lever proportions (between the arms of the lever $l\,m$, between the lever $h$ and bell-crank lever $g\,f$, and the engagement of the catch $f$ on the long lever-arm $e$) the release is easily effected. On the other hand, the frame $m$ need only be displaced to a very small distance in order to insure the release of the mechanism. (See Fig. 4.) This locking device may, however, be replaced by another, and the rotatory knife by one moving in guides.

What I claim as my invention, and desire to secure by Letters Patent, is—

1. In a poultry-killing apparatus, the combination with the box or receptacle having an opening in one wall, a pivoted lever carrying a frame arranged before said opening, a knife adapted to pass across said opening, means for operating the knife, a locking device for holding the knife retracted, and means for releasing said locking device independently thereof by an outward movement of the frame; substantially as described.

2. In a poultry-killing apparatus, the combination with the box or receptacle having an opening in one wall, a spring-actuated knife adapted to pass across the opening, a pivoted lever carrying a frame or cover arranged before said opening, the knife-lever, a bell-crank lever one arm of which engages the knife-lever to hold the knife retracted, and a spring-actuated arm adapted to strike the other arm of the bell-crank lever, to release the knife-lever; substantially as described.

3. In an apparatus such as described the combination with the spring-actuated knife, the pivoted lever carrying the frame adapted to be moved outward by the imprisoned bird, the bell-crank lever, for holding the knife retracted, the spring-actuated arm adapted to strike the bell-crank lever to release the knife, and the stop on the lever carrying the frame, for holding the spring-actuated arm; substantially as described.

4. In an apparatus such as described, the spring-actuated knife, a locking device for the knife, means for releasing the knife, and means for holding the knife while resetting; substantially as described.

5. In an apparatus such as described, the spring-actuated knife, mounted on a shaft, a locking device for the knife, the lever or arm for releasing the knife, a cam-disk on the knife-shaft, a locking-lever one end of which engages with said cam-disk to hold the knife while being set, and the other end adapted to be struck by the releasing-lever to unlock the knife-shaft; substantially as described.

In testimony whereof I have signed my name to this specification in the presence of two subscribing witnesses.

WILHELM LUCK.

Witnesses:
OTTO WORK,
C. S. FRANZ DUMMER.